(12) United States Patent
Watanabe et al.

(10) Patent No.: US 12,347,332 B2
(45) Date of Patent: Jul. 1, 2025

(54) INFORMATION PROCESSING DEVICE AND INFORMATION PROCESSING METHOD

(71) Applicant: SONY GROUP CORPORATION, Tokyo (JP)

(72) Inventors: Kazuhiro Watanabe, Tokyo (JP); Yuga Harada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/754,376

(22) PCT Filed: Oct. 2, 2020

(86) PCT No.: PCT/JP2020/037567
§ 371 (c)(1),
(2) Date: Mar. 31, 2022

(87) PCT Pub. No.: WO2021/070748
PCT Pub. Date: Apr. 15, 2021

(65) Prior Publication Data
US 2022/0375363 A1    Nov. 24, 2022

(30) Foreign Application Priority Data
Oct. 10, 2019 (JP) .................................. 2019-186961

(51) Int. Cl.
*G09B 19/00* (2006.01)
*G06F 8/34* (2018.01)
(Continued)

(52) U.S. Cl.
CPC ............ *G09B 19/0053* (2013.01); *G06F 8/34* (2013.01); *G09B 5/02* (2013.01); *G06Q 50/20* (2013.01)

(58) Field of Classification Search
CPC .......... G09B 5/02; G09B 19/0053; G06F 8/34
See application file for complete search history.

(56) References Cited

U.S. PATENT DOCUMENTS 5,259,766 A * 11/1993 Sack ........................ G09B 7/04
434/323
8,660,972 B1    2/2014 Heidenreich
(Continued)

FOREIGN PATENT DOCUMENTS

| CN | 106981228 A | 7/2017 |
| CN | 107704993 A | 2/2018 |

(Continued)

OTHER PUBLICATIONS

International Search Report and Written Opinion of PCT Application No. PCT/JP2020/037567, issued on Dec. 28, 2020, 11 pages of ISRWO.

(Continued)

*Primary Examiner* — Peter R Egloff
(74) *Attorney, Agent, or Firm* — CHIP LAW GROUP

(57) ABSTRACT

An information processing device includes an editing support unit that supports editing of a program by an editor, an execution unit that executes the program edited through the editing support unit on a program execution device, and an evaluation unit that evaluates the editor on the basis of activity of the program execution device. The editing support unit supports editing of the program for the program execution device to act on the basis of knowledge of a lesson subject other than programming education of the editor.

9 Claims, 6 Drawing Sheets

(51) Int. Cl.
*G09B 5/02* (2006.01)
*G06Q 50/20* (2012.01)

(56) References Cited

U.S. PATENT DOCUMENTS

| | | | | |
|---|---|---|---|---|
| 9,916,766 | B2* | 3/2018 | Rodmell | G06Q 10/105 |
| 10,529,247 | B1* | 1/2020 | McCartin-Lim | G09B 7/04 |
| 2003/0131337 | A1* | 7/2003 | Perumainar | G09B 19/0053 |
| | | | | 717/100 |
| 2013/0219374 | A1 | 8/2013 | Jain | |
| 2014/0170606 | A1* | 6/2014 | Chong | G06F 8/436 |
| | | | | 434/118 |
| 2016/0093232 | A1* | 3/2016 | Chong | G06F 8/436 |
| | | | | 434/118 |
| 2017/0278421 | A1* | 9/2017 | Du | G09B 7/02 |
| 2020/0043363 | A1* | 2/2020 | Grossman | G06F 9/453 |

FOREIGN PATENT DOCUMENTS

| | | |
|---|---|---|
| CN | 109634596 A | 4/2019 |
| CN | 109871322 A | 6/2019 |
| CN | 109933316 A | 6/2019 |
| JP | 2010-231580 A | 10/2010 |
| JP | 2016212271 A | 12/2016 |
| JP | 2017-161770 A | 9/2017 |
| JP | 2018-077342 A | 5/2018 |
| JP | 2019-144546 A | 8/2019 |
| KR | 101971660 B1 | 8/2019 |

OTHER PUBLICATIONS

Obara, et al., "Development and Evaluation of a Programming Experience System by using Operation Cards", IPSJ SIG Technical Reports: Computers in Education(CE), Mar. 11, 2016, 08 pages.

Sayaka Tohyama, "Collaborative Programming Learning using micro: bit in an Elementary School", IPSJ SIG Technical Reports: Computers in Education (CE), Mar. 3, 2019, 08 pages.

Ota, et al., "Development of Programming Learning Support System for Scratch with Automatic Performance Evaluation Based on Computational Thinking Concepts", Transactions of Japanese Society for Information and Systems in Education, vol. 35, No. 2, Apr. 1, 2018, pp. 204-214.

Information education of Kanou Abe, AI Era, First edition, Japan University Education Publishing, Nov. 20, 2017, pp. 52 68, pp. 61 to 62, ISBN978-4 to 86429, and 480 to 5, in particular.

"Information Education", First Edition, Japan, University Education Publishing, Nov. 20, 2017, p. 52 68.

* cited by examiner

| QUESTION | CORRECT ANSWER | ROBOT'S ANSWER |
|---|---|---|
| WHEN TEMPERATURE BECOMES HIGH, DO PLANTS GROW BIG? | O | O |
| IS IT COOL IN SUMMER? | O | × |
| DOES WATER IN SOIL DECREASE ON HOT DAY? | × | O |
| IF SUNNY WEATHER CONTINUES, DOES WATER IN SOIL INCREASE? | × | O |
| DO PLANTS GROW BIG IN SUMMER? | O | × |
| IF IT KEEPS RAINING, DO PLANTS GROW BIG? | × | O |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2020/037567 filed on Oct. 2, 2020, which claims priority benefit of Japanese Patent Application No. JP 2019-186961 filed in the Japan Patent Office on Oct. 10, 2019. Each of the above-referenced applications is hereby incorporated herein by reference in its entirety.

TECHNICAL FIELD

Technology disclosed in the present specification (hereinafter referred to as "the present disclosure") relates to an information processing device and an information processing method for supporting programming education.

BACKGROUND ART

With the spread of information terminals such as computers and smartphones and the development of information and communication technology such as sophistication of control technology for various devices, importance of program development technology is increasing. For this reason, even in elementary and secondary education stages, it is required to prepare an environment necessary for utilizing information means such as computers and information communication networks, and to enhance learning activities that appropriately utilize these.

For example, a proposal has been made for an educational support system in which it is possible to reduce a burden of an instructor's traveling instruction by providing an environment in which the instructor can easily grasp a learner who cannot obtain a predetermined result, and furthermore, it is possible to promote the learner's understanding even without a spontaneous question by the learner by detecting the learner's input or operation error made to obtain the predetermined result and notifying or suggesting a solution of the error (see Patent Document 1).

Furthermore, a proposal has been made in which a block mounting part that can mount a plurality of experience blocks and a device that moves according to a type and order of the blocks mounted on the block mounting part so that a user can learn a concept of programming experientially (see Patent Document 2).

CITATION LIST

Patent Document

Patent Document 1: Japanese Patent Application Laid-Open No. 2010-231580
Patent Document 2: Japanese Patent Application Laid-Open No. 2017-161770

SUMMARY OF THE INVENTION

Problems to be Solved by the Invention

An object of the technology according to the present disclosure is to provide an information processing device and an information processing method for supporting programming education.

Solutions to Problems

A first aspect of the technology according to the present disclosure is
an information processing device including:
an editing support unit that supports editing of a program by an editor;
an execution unit that executes the program edited through the editing support unit on a program execution device; and
an evaluation unit that evaluates the editor on the basis of activity of the program execution device.

The editing support unit supports editing of the program for the program execution device to act on the basis of knowledge of a lesson subject other than programming education of the editor. The editing support unit may support programming editing of the editor by visual programming.

Furthermore, the evaluation unit separately evaluates programming technique and a grade of the lesson subject of the editor by using a learning model obtained by learning a correlation between information regarding the lesson subject and the activity executed by the program execution device and the programming technique and the grade of the lesson subject.

Furthermore, a second aspect of the technology according to the present disclosure is
an information processing method including:
an editing support step of supporting editing of a program by an editor;
an execution step of executing the program edited through the editing support step on a program execution device; and
an evaluation step of evaluating the editor on the basis of activity of the program execution device.

Effects of the Invention

According to the technology according to the present disclosure, it is possible to provide an information processing device and an information processing method that support programming education in combination with another lesson subject.

Note that effects described in the present specification are merely examples, and the effects brought about by the technology according to the present disclosure are not limited thereto. Furthermore, there is also a case where the technology according to the present disclosure exerts additional effects in addition to the effects described above.

Still other objects, features, and advantages of the technology according to the present disclosure will be clarified by more detailed description based on an embodiment and accompanying drawings as described below.

MODE FOR CARRYING OUT THE INVENTION

Hereinafter, an embodiment of technology according to the present disclosure will be described in detail with reference to the drawings.

With the development of information and communication technology, it is desired to add a lesson subject related to programming education. On the other hand, there is an upper limit to the number of lessons that can be assigned in a week, and if a new lesson subject is set up, a schedule of other existing lesson subjects will be tightened and burdens on students will increase. For this reason, an educational method has been devised in which programming education and a lesson subject such as science or arithmetic are combined into one lesson subject to be studied at the same time.

However, there are some problems in implementing an integrated lesson by combining the programming education with the other lesson subject. For example, in a case where a teacher gives an exam and a student does not perform well, it is difficult to distinguish whether its cause is due to student's inexperienced programming skills or due to student's insufficient knowledge of an original lesson subject (science, arithmetic, etc.) and insufficient skill to explore it. That is, for the same exam question, either an error in an algorithm of a program created by the student or the student's lack of knowledge of the original lesson subject can lead to a similar incorrect answer. If the cause of the poor grade cannot be accurately grasped, the teacher cannot properly guide a student, such as giving extra guidance or advice on science or arithmetic to a student who gets a passing mark in the science or arithmetic, or not giving programming guidance or advice to a student who is behind in acquisition of programming skills.

To begin with, there is a case where a science or arithmetic teacher has insufficient programming skills. Even if the teacher can evaluate a student's science or arithmetic grade when conducting an exam, there is concern that the programming skills cannot be evaluated accurately.

Therefore, in the present specification, as the technology according to the present disclosure, the following proposes a programming education support device that can be applied to an integrated lesson subject by combining programming education and another lesson subject, that provides a programming environment for a student and can execute a created program, and that can separately evaluate student's programming skills and generation of an original lesson subject on the basis of a result of executing the program.

Figure 1:
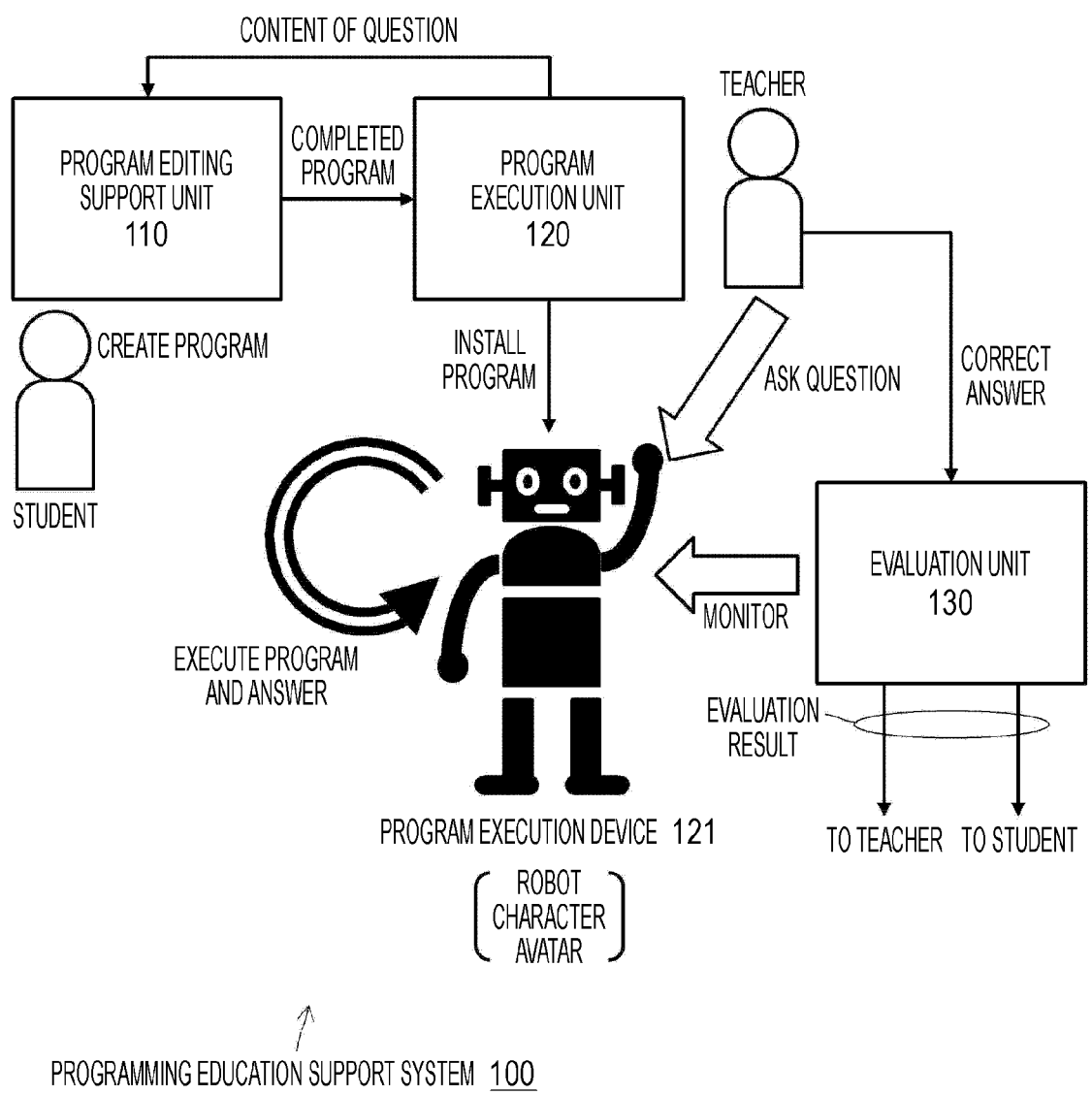
FIG. 1 is a diagram showing a functional configuration example of a programming education support system 100.

FIG. 1 schematically shows a functional configuration example of a programming education support system 100 to which the technology according to the present disclosure is applied. The illustrated programming education support system 100 includes a program editing support unit 110, a program execution unit 120, and an evaluation unit 130. For example, the program editing support unit 110, the program execution unit 120, and the evaluation unit 130 are each implemented as an individual device such as a personal computer (PC). In this case, communication between the program editing support unit 110, the program execution unit 120, and the evaluation unit 130 is performed, for example, through a wired or wireless local area network (LAN). Alternatively, the program editing support unit 110, the program execution unit 120, and the evaluation unit 130 may be computer programs executed on the same or a plurality of PCs. In this case, the communication between the program editing support unit 110, the program execution unit 120, and the evaluation unit 130 may be interprocess communication.

The program editing support unit 110 supports a student in creating and editing a program. The program execution unit 120 executes the program created through the program editing support unit 110 on a program execution device 121. The evaluation unit 130 evaluates a student's grade on the basis of activities of the program execution device 121 when the program created by the student is executed.

In the present embodiment, it is assumed that the programming education support system 100 is applied to an integrated lesson by combining programming education with another lesson subject such as science or arithmetic. Note that, in the following, the other lesson subject will be described in a unified manner for science, for convenience.

In an application environment assumed in the present embodiment, the student creates and edits a program for the program execution device 121 to act on the basis of student's own knowledge of science through the program editing support unit 110. Then, the program editing support unit 110 transfers the completed program to the program execution unit 120.

The program execution device 121 referred to here is a robot, a character (or an avatar) displayed on a display, or the like. The program execution device 121 is supposed to have a function of interacting with the teacher, and a dialogue format is not particularly limited to voice, gesture, character information, or the like. In a case where the robot is too expensive to prepare, the program execution device 121 may be a robot simulator. However, in the following, the program execution device 121 will be described in a unified manner for the robot, for convenience.

The program for acting on the basis of student's own knowledge of science is specifically a program described to carry out operation to answer a question about science from the teacher as the student intends. For example, it is a program to realize activities such as answering "High" to questions "What is the temperature on a sunny day?" and "What is the temperature in summer?", or answering "Plants grow big" to questions "What if plants are watered?" and "With water in the soil?". By the way, the program for acting on the basis of knowledge of arithmetic rather than that of science is, for example, a program for realizing activities such as a robot drawing an equilateral triangle correctly and answering four arithmetic operations.

The program execution unit 120 is basically operated by the teacher of the lesson. The program execution unit 120 installs the program transferred from the program editing support unit 110 on the robot, and the robot executes the program, so that the robot can act on the basis of the knowledge of science of the student who has created the program.

The teacher prepares a question for the student regarding the creation of such a program and asks the student the question. The teacher may present a content of the question to the student by writing on a medium such as paper, on a blackboard or whiteboard, or verbally. In the present programming education support system 100, the teacher inputs the content of the question to the program execution unit 120, and the program execution unit 120 transfers the content of the question to the program editing support unit 110. Then, the program editing support unit 110 may provide the student with an editing environment that facilitates creation and editing of a program for the robot to act according to the content of the question.

The program editing environment provided for the student by the program editing support unit 110 is not particularly limited. The program editing support unit 110 includes only a console based on a character user interface, and the student may create a source code. However, in the present embodiment, it is assumed that the program editing support unit 110 prepares an editing environment focusing on student's consideration of an algorithm of the program necessary for the robot to act as intended (in other words, according to the science question given by the teacher) rather than coding the program. That is, it is desirable that the program editing support unit 110 has an editing environment in which the program editing support unit 110 does not require knowledge of grammar of a specific programming language and does not require debugging work that relies on knowledge of the programming language.

Figure 2:
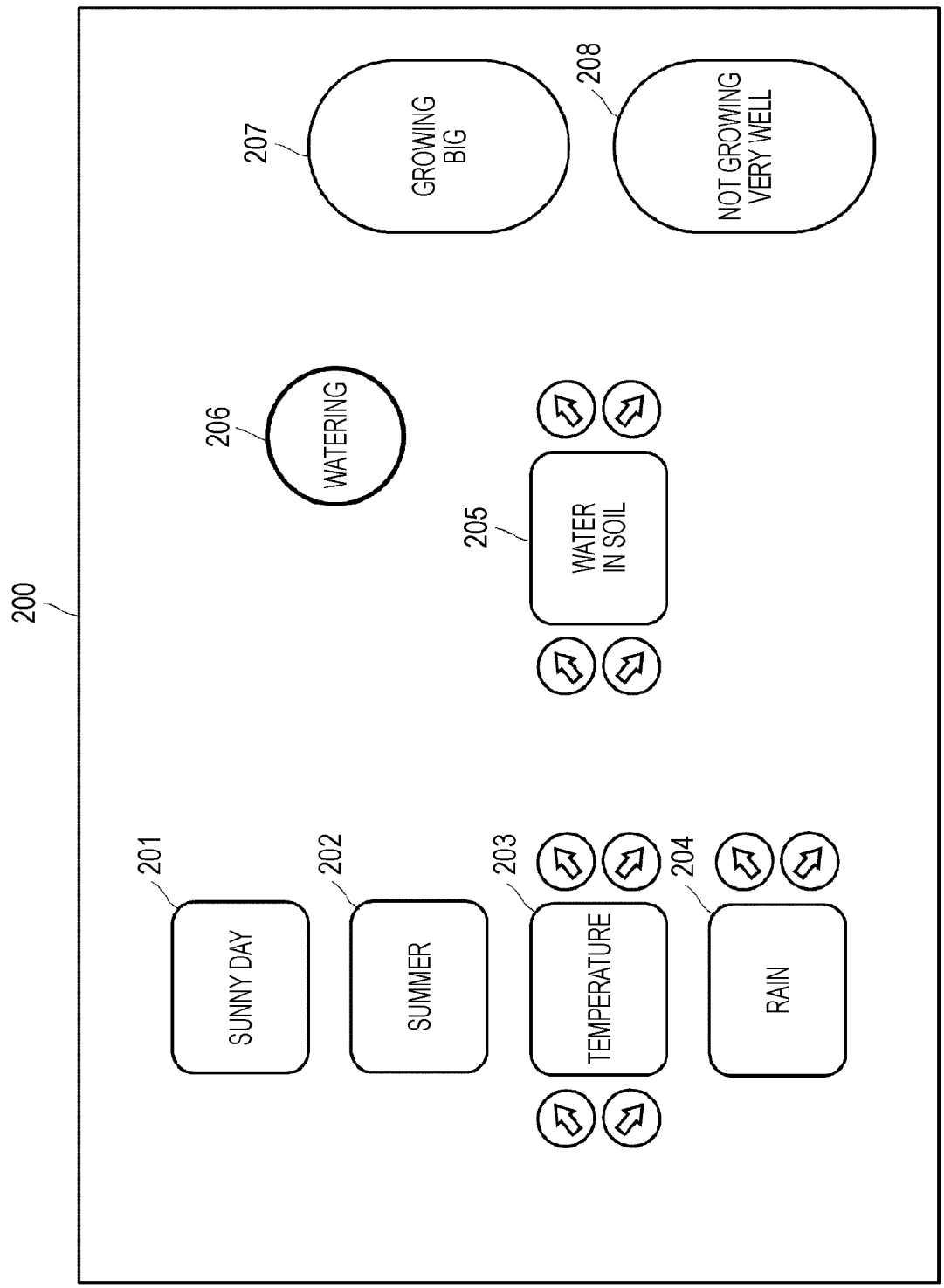
FIG. 2 is a diagram showing an example of an editing screen 200 of a visual programming language.

For example, the program editing support unit 110 may provide the student with an editing environment in which a visual programming language can be used. FIG. 2 shows an example of an editing screen 200 of the visual programming language provided by the program editing unit 110 for the student. In a typical visual programming language, objects represented by circles or rectangles are placed on the editing screen 200, and a program creator (a student in the present embodiment) connects the objects with arrows, lines, or arcs, so that an algorithm of a program can be described.

In the example shown in FIG. 2, as shown by reference numbers 201 to 208, a plurality of objects corresponding to a subject, an object, a predicate, etc., such as "sunny day", "summer", "temperature", "rain", "watering", "in soil", "growing big", "not growing very well" is placed on the editing screen 200. These objects correspond to contents of questions given by the teacher to the student. The teacher may prepare these objects by himself/herself. Alternatively, the teacher may create a science exam question in a text format as before, and the program execution unit 120 or the program editing support unit 110 may convert this exam question into an object to be placed on the editing screen 200 or automatically generate an object.

Figure 3:
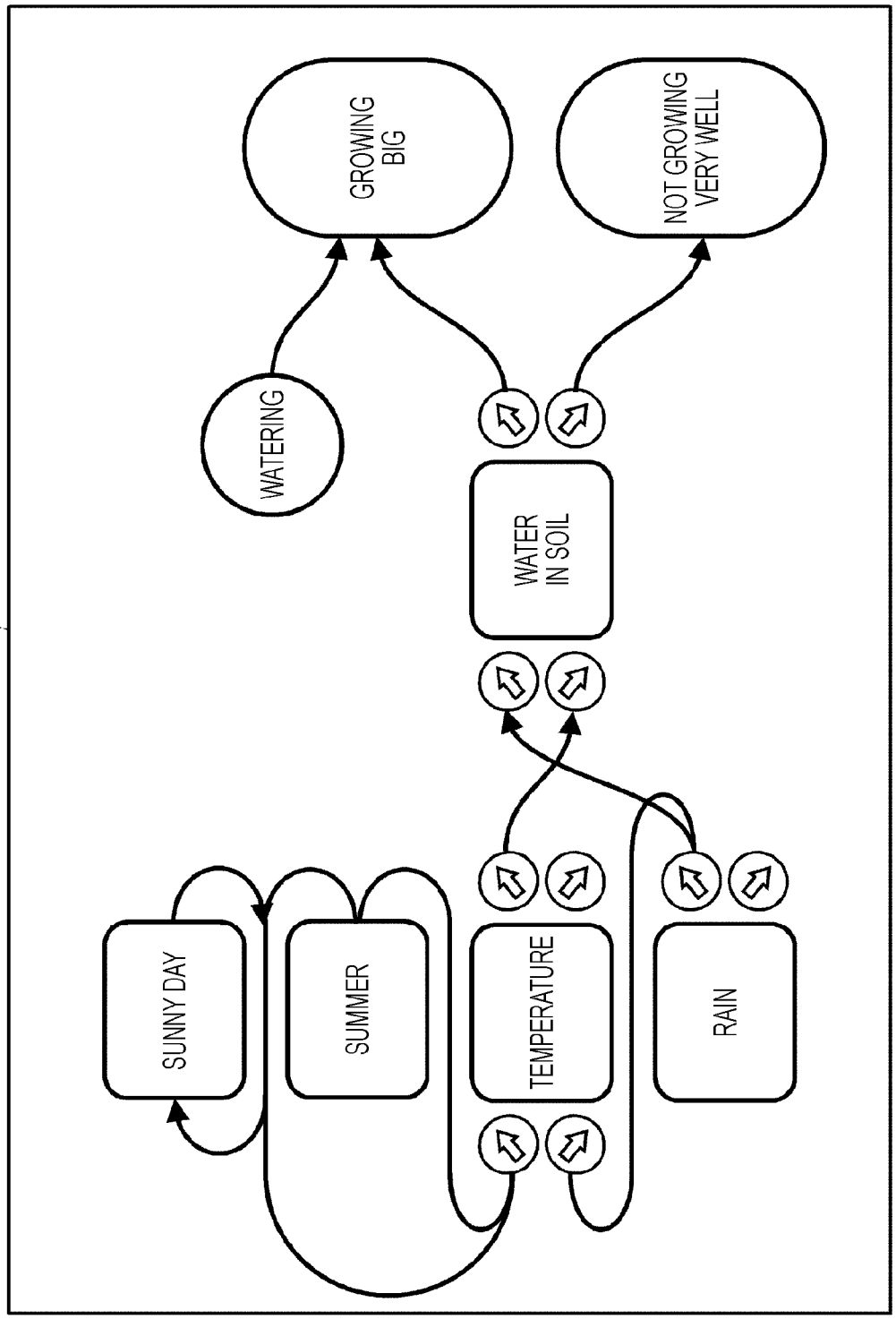
FIG. 3 is a diagram showing an example of a program creation result on the editing screen 200 of the visual programming language.

As shown in FIG. 3, the student creates an algorithm of the program for the robot to act by performing an operation of connecting the objects 201 to 208 with arrows, lines, and arcs on the editing screen 200. On the basis of his/her own knowledge of science, the student can create the algorithm of the program for the robot to answer the following science-related questions from the teacher via the editing screen 200 shown in FIGS. 2 and 3. The student can learn science through the program creation. Furthermore, the program created by the student is expected to be a program that enables the robot to act on the basis of student's own knowledge of science.

[Mathematical Formula 1]
1. WHEN TEMPERATURE BECOMES HIGH, DO PLANTS GROW BIG?
2. IS IT COOL IN SUMMER?
3. DOES WATER IN SOIL DECREASE ON HOT DAY?
4. IF SUNNY WEATHER CONTINUES, DOES WATER IN SOIL INCREASE?
5. DO PLANTS GROW BIG IN SUMMER?
6. IF IT KEEPS RAINING, DO PLANTS GROW BIG?

The program editing support unit 110 may output the algorithm of the program created in the visual programming language format to the program execution unit 120 as it is, or may output the algorithm to the program execution unit 120 by converting it into a source code of another computer language (for example, C language) format expressing the algorithm of the program, or further, may output the algorithm to the program execution unit 120 after compiling the source code.

The program execution unit 120 installs the program transferred from the program editing support unit 110 on the robot. Then, the robot executes the installed program. It is assumed that the robot that executes the program created by the student acts on the basis of knowledge of science of the student who has created the program.

The teacher asks the robot, not the student, a question about science. In response, the robot answers the question from the teacher according to the running program. Exchange of the question and answer between the teacher and the robot may be in a voice dialogue format. The robot may answer by voice, by using a gesture, or by any format. For an alternative question, the robot may output a signal identifying a selected branch. Of course, the teacher may input a question about science using a user interface (keyboard, etc.) of the program execution unit 120, and transfer question data from the program execution unit 120 to the robot.

As mentioned above, the student creates the program that enables the robot to act on the basis of the student's own knowledge of science. Therefore, it is assumed that the robot executing the program created by the student answers the question from the teacher on the basis of the knowledge of science of the student who has created the program.

The evaluation unit 130 monitors the robot running the program created by the student. The evaluation unit 130 acquires a question about science asked by the teacher to the robot. Furthermore, in the evaluation unit 130, a correct answer to the question asked by the teacher to the robot is acquired from the teacher or is input via the program execution unit 120. For example, as shown in FIG. 4, the evaluation unit 130 can acquire questions and correct answers, and answers given by the robot to the questions.

The evaluation unit 130 evaluates each of the student's programming skills and knowledge of science on the basis of the question about science asked by the teacher and the correct answer, and a result of the robot's answer. Then, the evaluation unit 130 notifies the teacher and the student of an evaluation result. The teacher creates a student's report card on the basis of the evaluation result notified by the evaluation unit 130. Furthermore, the student may also be indirectly notified of the evaluation result through the teacher (for example, by the report card) instead of directly notifying him/her of the evaluation result.

In the programming education support system 100, an integrated lesson by combining programming education and science is implemented. The result of the robot's answer to the question about science asked by the teacher is a mixed result of the student's programming skills and the student's knowledge of science. For example, a cause of an incorrect answer of the robot is considered to be a case of an algorithm error in the program created by the student or a case of the student's lack of knowledge of science. Furthermore, even though the student cannot give a correct answer, the robot may answer a question correctly due to the algorithm error in the program created by the student.

Figures 4, 5:
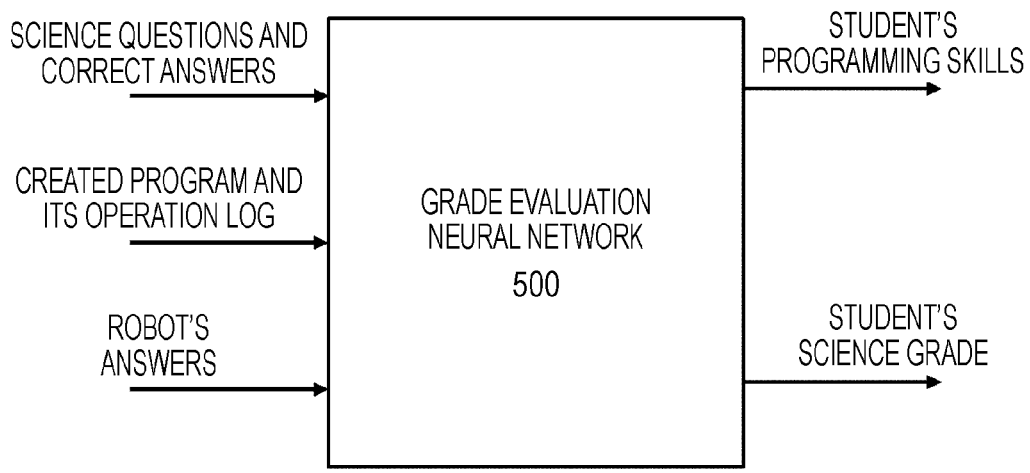
FIG. 4 is a table showing an example of questions and correct answers related to science, as well as robot's answers.
FIG. 5 is a diagram showing an operation example of a grade evaluation neural network 500.

If the student answers directly in a science exam, the student's knowledge of science can be gained by simply scoring the exam results as shown in FIG. 4, but the student's programming skills cannot be evaluated. On the other hand, in the form of a lesson in which a student creates a program and conducts a science exam on a robot that executes the program, the student can learn science and programming at the same time, but it is difficult to separately evaluate students' programming skills and knowledge of science from a result of the exam on the robot. In addition, even if the teacher is familiar with science, if he/she does not have sufficient programming skills, it is difficult to directly look at the program (created by the student) output from the programming editing support unit 110 and evaluate the student's programming skills.

Therefore, in the present embodiment, the evaluation unit 130 uses artificial intelligence to separately evaluate the student's programming skills and knowledge of science from the result of the robot's answer to the question regarding science asked by the teacher.

Here, the artificial intelligence is a function that artificially realizes functions exhibited by a human brain, for example, learning, reasoning, data creation, and planning, by software or hardware. The artificial intelligence generally utilizes a learning model represented by a neural network that imitates a human brain neural circuit. The neural network is a network formed by connecting artificial neurons (hereinafter, also simply referred to as "neurons") via synapses. The artificial intelligence has a mechanism to build a learning model that estimates an optimum solution (output) for a question (input) while changing a connection weight coefficient between neurons by repeating learning that uses learning data.

Note that, in order to evaluate students' programming skills and knowledge of science with higher accuracy, it is preferable to use a neural network that performs deep learning (DL). In a case where the deep learning is performed, the number of learning data and the number of synapses are large. Therefore, it seems appropriate to perform the deep learning using huge computer resources such as the cloud.

FIG. 5 schematically shows an operation example of a grade evaluation neural network 500 used as artificial intelligence in the evaluation unit 130. The grade evaluation neural network 500 has a learning model that represents a correlation between a science question and its correct answer, a program created by a student, an answer result of a robot that executes the program created by the student, student's programming skills, and student's knowledge of science. Therefore, when the science question and its correct answer and the answer result of the robot that executes the program created by the student are input, the grade evaluation neural network 500 can output a result of separately evaluating the student's programming skills and knowledge of science. Note that, an operation log at the time of creation using the program editing support unit 110 may be input to the grade evaluation neural network 500 in addition to the program created by the student.

Even if a science teacher has poor programming skills and cannot evaluate the program created by the student, he/she only needs to give a science question to the robot that executes the program created by the student. In the grade evaluation neural network 500, the question given by the science teacher and the correct answer, the program created by the student and the operation log at the time of creation, and the answer to the science question by the robot that executes the program created by the student are input, and the result of separately evaluating the student's programming skills and knowledge of science is output on the basis of a result of prior learning.

It can be difficult to separately evaluate the student's programming skills and knowledge of science solely from the result of checking a robot answer to a single science question. This is because in a case where an incorrect answer is made, it is possible to consider two causes, that is, an algorithm error in the program created by the student and the student's lack of knowledge of science, and it is difficult to distinguish between them with just one question. Furthermore, even if the answer is correct, it can be considered that the robot gives an answer that is different from the student's intention due to an algorithm error in the program created by the student, in addition to the fact that passing marks are given to both the student's programming skills and knowledge of science, and it is difficult to distinguish by just asking one question.

On the other hand, by using the grade evaluation neural network 500 equipped with the learning model obtained by learning the correlation between multiple answers given by the robot to multiple science questions and the student's programming skills and the students' knowledge of science, it is possible to distinguish between the student's programming skills and the student's knowledge of science and output a more accurate evaluation result. For example, a neural network having a recursive structure (recurrent neural network: RNN) may be used for the neural network 500.

Figure 6:
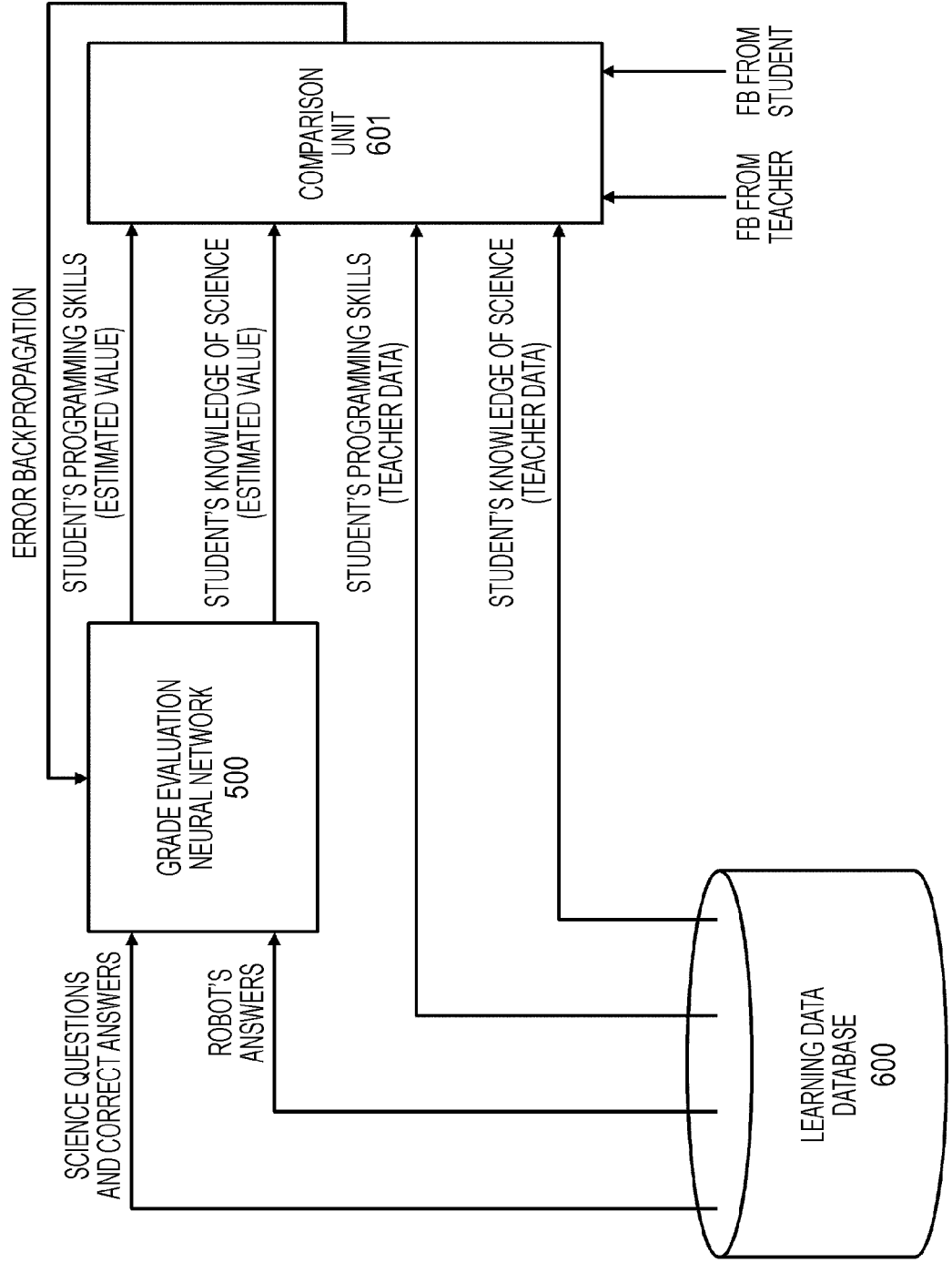
FIG. 6 is a diagram showing a mechanism for learning of the grade evaluation neural network 500.

FIG. 6 illustrates a mechanism for learning of the grade evaluation neural network 500.

As learning data for the grade evaluation neural network 500, a learning data database 500 accumulates a huge amount of learning data including a combination of science questions and correct answers, and robot answers to the science questions as input vectors to the grade evaluation neural network 500 and a combination of student's programming skills and knowledge of science as output vectors from the grade evaluation neural network 500.

At the time of learning of the grade evaluation neural network 500, the learning data is taken out one by one, and the science question and the correct answer, and the robot's answer to the science question as the input vectors are input to the grade evaluation neural network 500. Each time the input vectors are input, the grade evaluation neural network 500 separately outputs the programming skills of the student who has created the program to be executed by the robot and his/her knowledge of science.

A comparison unit 601 compares the student's programming skills and knowledge of science output from the grade evaluation neural network 500 with student's programming skills and knowledge of science as output vectors extracted from the learning data database 600. The comparison unit 601 defines a loss function based on a difference between the output vectors of the grade evaluation neural network 500 and the output vectors extracted from the learning data database 600. Then, the grade evaluation neural network 500 learns by backpropagation (an error backpropagation method) so that this loss function is minimized. Then, a learning model having a set of connection weight coefficients between neurons in the grade evaluation neural network 500 when the loss function is minimized is used as a final learning result.

Furthermore, the evaluation unit 130 notifies the teacher and the student of the student's programming skills and knowledge of science estimated by the grade evaluation neural network 500 (described above). The teacher or the student returns feedback (FB) that he/she is convinced or not convinced with evaluation of the programming skills and the knowledge of science (for example, distribution of evaluations of the programming skills and the knowledge of science is incorrect). The comparison unit 601 may define a loss function that further considers a difference between the evaluation result by the grade evaluation neural network 500 and the feedback of the teacher or the student, and perform learning of the grade evaluation neural network 500.

Figure 7:
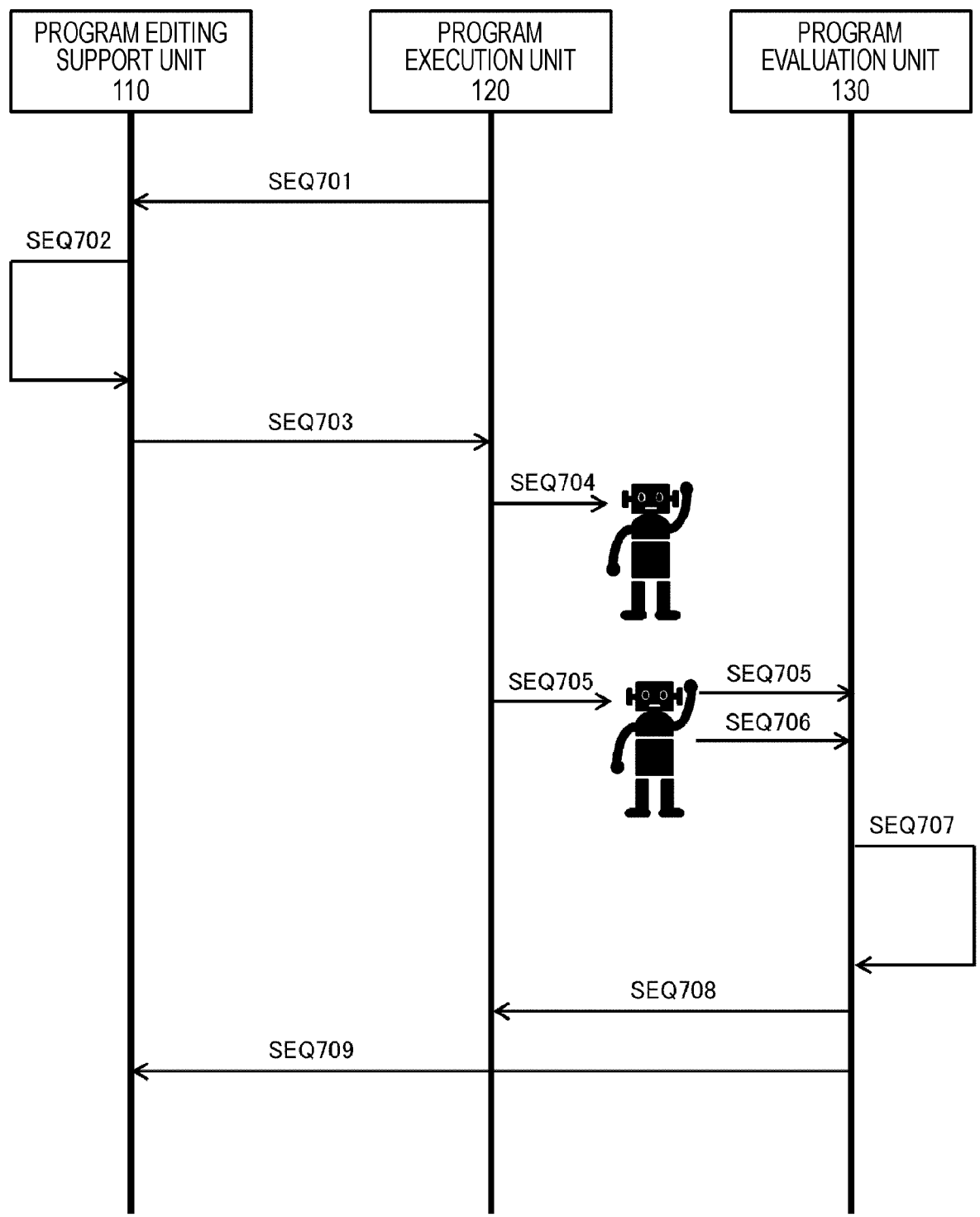
FIG. 7 is a diagram showing an operation sequence example of the programming education support system 100.

FIG. 7 shows an operation sequence example of the programming education support system 100 according to the present embodiment.

The program execution unit 120 transfers a question related to program creation prepared by a teacher to the program editing support unit 110 (SEQ701). Here, it is basically assumed that question data input by the teacher to the program execution unit 120 is transferred to the program editing support unit 110. However, without data communication between the program execution unit 120 and the program editing support unit 110, the teacher may present a content of the question to a student by writing on a medium such as paper, on a blackboard or a whiteboard, or verbally.

The program editing support unit 110 provides the student, for example, with an editing environment that does not require knowledge of grammar of a specific programming language, such as visual programming, and does not require debugging work that relies on knowledge of the programming language. The student uses the program editing support unit 110 to create and edit a program for a robot to act on the basis of student's own knowledge of science (SEQ702).

Then, the program editing support unit 110 transfers the completed program to the program execution unit 120 (SEQ703).

The program execution unit 120 installs the program transferred from the program editing support unit 110 on the robot (SEQ704). By executing the program, the robot can act on the basis of the knowledge of science of the student who has created the program.

Thereafter, the teacher asks the robot, not the student, a question about science (SEQ705). In response, the robot answers the question from the teacher according to the running program (SEQ706).

The student creates the program that enables the robot to act on the basis of the student's own knowledge of science. Therefore, it is assumed that the robot executing the program created by the student answers the question from the teacher on the basis of the knowledge of science of the student who has created the program.

The evaluation unit 130 acquires the question that the teacher asked to the robot and a correct answer, and the answer given by the robot to the question. A method of acquiring these data is arbitrary. For example, the evaluation unit 130 may acquire these data by voice-recognizing a dialogue between the teacher and the robot, or may acquire these data from the program execution unit 120 or the robot by data communication.

Then, the evaluation unit 130 uses the grade evaluation neural network 500 to separately evaluate the student's programming skills and knowledge of science from a result of the robot's answer to the question about science asked by the teacher (SEQ707). The grade evaluation neural network 500 has a learning model that has learned in advance the correlation between the science question and its correct answer, the answer result of the robot that executes the program created by the student, the student's programming skills, and the student's knowledge of science (described above).

Thereafter, the evaluation unit 130 respectively notifies the teacher and the student of the student's programming skills and knowledge of science estimated by the grade evaluation neural network 500 (SEQ708, SEQ709).

INDUSTRIAL APPLICABILITY

The technology according to the present disclosure has been described above in detail with reference to the specific embodiment. However, it is self-evident that a person skilled in the art can modify or substitute the embodiment without departing from the gist of the technology according to the present disclosure.

The technology according to the present disclosure can be applied to a lesson that integrates programming education with science and various other lesson subjects, and can separately evaluate student's programming skills and grade of an original lesson subject with accuracy. Furthermore, the technology according to the present disclosure can be applied not only to elementary and secondary education but also to programming education at various stages such as universities, vocational schools, and working adults.

In short, the technology according to the present disclosure has been described in the form of an example, and the contents of the present specification should not be interpreted in a limited manner. In other words, the scope of the claims should be considered in order to determine the gist of the technology according to the present disclosure.

Note that the technology according to the present disclosure can also have the following configurations.

(1) An information processing device including:
an editing support unit that supports editing of a program by an editor;
an execution unit that executes the program edited through the editing support unit on a program execution device; and
an evaluation unit that evaluates the editor on the basis of activity of the program execution device.

(2) The information processing device according to (1) described above,
in which the editing support unit supports editing of the program for the program execution device to act on the basis of knowledge of a lesson subject other than programming education of the editor.

(3) The information processing device according to either one of (1) and (2) described above,
in which the execution unit controls activity of a robot or a character as the program execution device according to the program edited through the editing support unit.

(4) The information processing device according to any one of (1) to (3) described above,
in which the evaluation unit separately evaluates a programming technique and a grade of the lesson subject of the editor on the basis of activity executed by the program execution device that executes the program with respect to information regarding the lesson subject.

(5) The information processing device according to (4) described above,
in which the evaluation unit evaluates the programming technique and the grade of the lesson subject of the editor by using a learned learning model.

(6) The information processing device according to (5) described above,
in which the evaluation unit separately evaluates the programming technique and the grade of the lesson subject of the editor by using the learning model obtained by learning a correlation between the information regarding the lesson subject and the activity executed by the program execution device and the programming technique and the grade of the lesson subject.

(7) The information processing device according to any one of (1) to (6) described above,
in which the editing support unit supports programming editing of the editor by visual programming.

(8) An information processing method including:
an editing support step of supporting editing of a program by an editor;
an execution step of executing the program edited through the editing support step on a program execution device; and
an evaluation step of evaluating the editor on the basis of activity of the program execution device.

(8-1) The information processing method according to (8) described above,
in which in the editing support step, editing of the program for the program execution device to act on the basis of knowledge of a lesson subject other than programming education of the editor is supported.

(8-2) The information processing method according to either one of (8) and (8-1) described above,
in which in the execution step, activity of a robot or a character as the program execution device is controlled according to the program edited in the editing support step.

(8-3) The information processing method according to any one of (8) to (8-2) described above,
in which in the evaluation step, a programming technique and a grade of the lesson subject of the editor are separately evaluated on the basis of activity executed by the program execution device that executes the program with respect to information regarding the lesson subject.

(8-4) The information processing method described in (8-3) described above,
in which in the evaluation step, the programming technique and the grade of the lesson subject of the editor are evaluated using a learned learning model.

(8-5) The information processing method described in (8-4) described above,
in which in the evaluation step, the programming technique and the grade of the lesson subject of the editor are separately evaluated by using the learning model obtained by learning a correlation between the information regarding the lesson subject and the activity executed by the program execution device and the programming technique and the grade of the lesson subject.

(8-6) The information processing method according to any one of (8) to (8-5) described above,
in which in the editing support step, programming editing of the editor is supported by visual programming.

REFERENCE SIGNS LIST

100 Programming education support system
110 Program editing support unit
120 Program execution unit
121 Program execution device (robot, character, avatar, . . . )
130 Evaluation unit
500 Neural network
600 Learning data database
601 Comparison unit

The invention claimed is:
1. An information processing device, comprising:
circuitry configured to:
place, on an editing screen, a plurality of objects corresponding to contents of a plurality of questions;
generate an algorithm of a program based on connections, by a student, between the plurality of objects placed on the editing screen;
execute the program on a program execution device; and
separately evaluate a programming technique of the student and a grade of a lesson subject of the student, based on the execution of the program by the program execution device, wherein
the program execution device provides answers to the plurality of questions based on the execution of the program, and
the programming technique of the student and the grade of the lesson subject of the student are separately evaluated based on the answers, from the program execution device, to the plurality of questions.

2. The information processing device according to claim 1,
wherein the program causes the program execution device to act based on knowledge of the lesson subject other than programming education of the student.

3. The information processing device according to claim 1,
wherein the circuitry is further configured to control activity of a robot or a character as the program execution device according to the program.

4. The information processing device according to claim 1,
wherein the program execution device executes the program based on information regarding the lesson subject.

5. The information processing device according to claim 4,
wherein the circuitry is further configured to evaluate the programming technique and the grade of the lesson subject of the student by using a learned learning model.

6. The information processing device according to claim 5,
wherein the circuitry is further configured to separately evaluate the programming technique and the grade of the lesson subject of the student by using the learned learning model obtained by learning a correlation between the information regarding the lesson subject and the answers from the program execution device and the programming technique and the grade of the lesson subject.

7. The information processing device according to claim 1,
wherein the connections by the student is performed by visual programming operations.

8. An information processing method, comprising:
placing, on an editing screen, a plurality of objects corresponding to contents of a plurality of questions;
generating an algorithm of a program based on connections, by a student, between the plurality of objects placed on the editing screen;
executing the program on a program execution device; and
separately evaluating a programming technique of the student and a grade of a lesson subject of the student, based on the execution of the program by the program execution device, wherein
the program execution device provides answers to the plurality of questions based on the execution of the program, and
the programming technique of the student and the grade of the lesson subject of the student are separately evaluated based on the answers, from the program execution device, to the plurality of questions.

9. An information processing device, comprising:

circuitry configured to:
- place, on an editing screen, a plurality of objects corresponding to contents of a plurality of questions;
- generate an algorithm of a program based on connections, by a student, between the plurality of objects placed on the editing screen;
- execute the program on a program execution device, wherein the program execution device provides answers to the plurality of questions based on the execution of the program; and
- evaluate a programming technique of the student based on a learned learning model, wherein
  - the learned learning model represents a correlation between the program based on the connections by the student, the answers from the program execution device, and the programming technique of the student.

* * * * *